No. 12,409. REISSUED NOV. 21, 1905.

E. POLLARD.

KINDLING BLOCK.

APPLICATION FILED OCT. 17, 1905.

Attest:

C. S. Middleton

Edward N. Sexton

Inventor

Edwin Pollard.

By Spear, Middleton, Donaldson & Spear

Att'ys.

UNITED STATES PATENT OFFICE.

EDWIN POLLARD, OF DOUGLAS, ISLE OF MAN.

KINDLING-BLOCK.

No. 12,409. Specification of Reissued Letters Patent. Reissued Nov. 21, 1905.

Original No. 733,675, dated July 14, 1903. Application for reissue filed October 17, 1905. Serial No. 283,194.

*To all whom it may concern:*

Be it known that I, EDWIN POLLARD, a subject of the King of Great Britain and Ireland, residing at Eaglehurst, Douglas, Isle of Man, formerly of Silsden, in the county of York, England, have invented certain new and useful Improvements in Kindling-Blocks, of which the following is a specification.

My invention relates to kindling-blocks of the class made up out of a single block of wood with opposite faces grooved, so as to form openings through the block for the passage of the flame.

My present invention is designed to make the block more readily ignitible by providing thinner portions in the nature of films which will ignite more quickly than the thicker portions. To this end I provide the blocks with intermediate films located within the grooves and further add to the ignitible character of the block by providing a thin film between the grooves of the two faces of the block—that is, instead of having openings through from one side to the other I leave a thin film at the bottom of the grooves; but I make it so thin that the flames immediately take hold upon it, and it offers no obstruction to the passage of the air from side to side of the block, as it is so quickly burned away.

Figure 1:
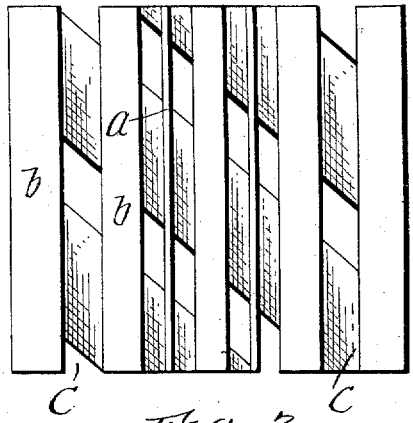
Figure 2:
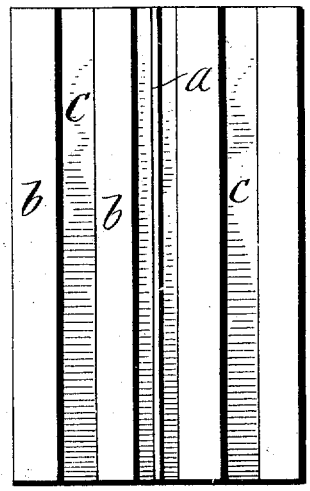

In the accompanying drawings, Figure 1 shows a plan view of my improved block with the vertically-arranged film. Fig. 2 is a view of the invention as applied to another shape of block, showing also the horizontal film, while Fig. 3 is a section of Fig. 2.

Instead of, as heretofore, making the kindling-block with a uniform grooved surface I have in my present invention provided intermediate of the projections in the grooves between the same a thin film *a*. The regular projections are shown at *b* and the main grooves at *c*. The film *a* divides up the groove, and being thin the flames more readily attack its sides, and thus assure the quick ignition of the block. These films may be arranged alternately with the regular projections or only centrally of the block, as may be desired or found necessary.

Figure 3:
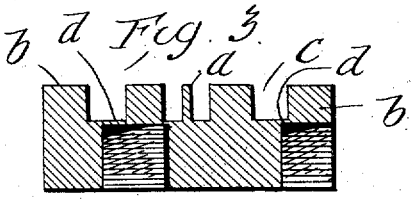

In Figs. 2 and 3 I show in addition to the film *a* a horizontal film *d*. Ordinarily, as in Fig. 1, openings pass through from side to side of the block; but I may close these openings by a thin film of wood, this being effected in the course of manufacture of the block by limiting the depth of cut, so as to leave just such a film as will readily be burned out quickly and tend to make the block ignite readily.

I do not limit myself to shape or form of block, as this may vary.

What I claim is—

1. A kindler-block having grooves in its upper and lower faces extending partially through the thickness of the block and a horizontal film between and closing said grooves, said film being thin so as to be easily ignitible.

2. A kindler-block having upper and lower grooved faces, a film between the upper and lower groove, and films in the grooves, substantially as described.

3. A kindler-block having upper and lower grooved faces the grooves in one face extending at an angle to the grooves in the opposite face, and an ignitible film located in the groove on one face of the block and extending across the position of the grooves in the other face of the block, substantially as described.

4. A kindler-block having upper and lower grooved faces, ignitible films located in the longitudinal grooves and crossing the grooves upon the opposite face of the block which extend at an angle to the longitudinal grooves, substantially as described.

EDWIN POLLARD.

Witnesses:
FRANK POLLARD,
WILLIAM KELLY.